(12) United States Patent
Xiong et al.

(10) Patent No.: US 11,284,126 B2
(45) Date of Patent: Mar. 22, 2022

(54) METHOD AND SYSTEM FOR STREAMING MEDIA LIVE BROADCAST

(71) Applicant: SZ DJI TECHNOLOGY CO., LTD., Shenzhen (CN)

(72) Inventors: Chuantang Xiong, Shenzhen (CN); Liming Fan, Shenzhen (CN); Zhiqiang Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/861,876

(22) Filed: Apr. 29, 2020

(65) Prior Publication Data

US 2020/0260125 A1 Aug. 13, 2020

Related U.S. Application Data

(63) Continuation of application No. PCT/CN2017/109585, filed on Nov. 6, 2017.

(51) Int. Cl.
| | |
|---|---|
| *H04N 7/173* | (2011.01) |
| *H04N 21/2187* | (2011.01) |
| *H04L 67/101* | (2022.01) |
| *H04N 21/222* | (2011.01) |
| *H04N 21/238* | (2011.01) |

(Continued)

(52) U.S. Cl.
CPC ....... *H04N 21/2187* (2013.01); *H04L 67/101* (2013.01); *H04N 21/222* (2013.01); *H04N 21/238* (2013.01); *H04N 21/2393* (2013.01); *H04N 21/2405* (2013.01)

(58) Field of Classification Search
CPC ............ H04N 21/2187; H04N 21/222; H04N 21/238; H04N 21/2393; H04N 21/2405; H04N 21/2385; H04N 21/2402; H04N 21/2408; H04N 21/23103
USPC .......................................... 725/116
See application file for complete search history.

(56) References Cited

U.S. PATENT DOCUMENTS

| | | | | |
|---|---|---|---|---|
| 5,682,597 A | * | 10/1997 | Ganek ................ | H04N 7/17318 348/E7.071 |
| 5,724,646 A | * | 3/1998 | Ganek ................ | H04N 7/17318 725/89 |

(Continued)

FOREIGN PATENT DOCUMENTS

| | | |
|---|---|---|
| CN | 1980376 A | 6/2007 |
| CN | 101039281 A | 9/2007 |

(Continued)

OTHER PUBLICATIONS

The World Intellectual Property Organization (WIPO) International Search Report for PCT/CN2017/109585 dated Jul. 26, 2018 7 pages.

*Primary Examiner* — Michael B. Pierorazio
(74) *Attorney, Agent, or Firm* — Anova Law Group, PLLC

(57) ABSTRACT

A streaming media live broadcast method for a load balancing layer includes: receiving a live broadcast request from a terminal, the live broadcast request including an up-streaming request or a down-streaming request; selecting a streaming media server from a plurality of streaming media servers; and forwarding the live broadcast request to the selected streaming media server to cause the selected streaming media server to provide a live broadcast service according to the broadcast request.

19 Claims, 4 Drawing Sheets

(51) Int. Cl.
*H04N 21/239* (2011.01)
*H04N 21/24* (2011.01)

(56) References Cited

U.S. PATENT DOCUMENTS

| | | | | |
|---|---|---|---|---|
| 6,049,333 A * | 4/2000 | LaJoie | H04N 5/44543 | 715/718 |
| 6,263,504 B1 * | 7/2001 | Ebisawa | H04N 7/17318 | 348/E7.071 |
| 6,453,115 B1 * | 9/2002 | Boyle | G11B 20/10 | 386/346 |
| 6,798,971 B2 * | 9/2004 | Potrebic | H04N 21/4334 | 386/298 |
| 7,409,140 B2 * | 8/2008 | Rodriguez | H04N 5/76 | 348/E5.007 |
| 7,505,081 B2 * | 3/2009 | Eshleman | H04N 5/775 | 348/565 |
| 8,363,102 B1 * | 1/2013 | Kadoch | H04N 7/18 | 348/148 |
| 8,893,164 B1 * | 11/2014 | Teller | G06Q 30/0269 | 725/12 |
| 2002/0174430 A1 * | 11/2002 | Ellis | H04N 21/4751 | 725/46 |
| 2002/0184638 A1 * | 12/2002 | Agnihotri | H04L 67/125 | 725/89 |
| 2003/0005454 A1 * | 1/2003 | Rodriguez | H04N 21/4147 | 725/89 |
| 2003/0110514 A1 * | 6/2003 | West | H04N 21/4263 | 725/134 |
| 2003/0177492 A1 * | 9/2003 | Kanou | H04N 21/4334 | 725/39 |
| 2003/0208767 A1 * | 11/2003 | Williamson | H04N 21/2221 | 725/93 |
| 2003/0226150 A1 * | 12/2003 | Berberet | H04N 21/4334 | 725/94 |
| 2004/0078829 A1 * | 4/2004 | Patel | H04N 21/4325 | 725/135 |
| 2004/0133923 A1 * | 7/2004 | Watson | H04N 7/163 | 725/134 |
| 2005/0034171 A1 * | 2/2005 | Benya | H04N 21/4227 | 725/143 |
| 2007/0157281 A1 * | 7/2007 | Ellis | H04N 7/17309 | 725/134 |
| 2007/0162487 A1 * | 7/2007 | Frailey | H04N 7/165 | |
| 2007/0208874 A1 * | 9/2007 | Previdi | H04L 67/2814 | 709/238 |
| 2008/0022347 A1 * | 1/2008 | Cohen | H04N 21/2387 | 725/134 |
| 2008/0092181 A1 * | 4/2008 | Britt | H04N 21/47202 | 725/87 |
| 2008/0127253 A1 * | 5/2008 | Zhang | H04N 21/478 | 725/35 |
| 2009/0025027 A1 * | 1/2009 | Craner | H04N 21/233 | 725/32 |
| 2009/0087161 A1 * | 4/2009 | Roberts | H04N 21/2743 | 386/282 |
| 2009/0106387 A1 * | 4/2009 | Anbalagan | H04L 29/12933 | 709/217 |
| 2009/0148124 A1 * | 6/2009 | Athsani | H04N 21/84 | 386/241 |
| 2009/0150941 A1 * | 6/2009 | Riedl | H04N 21/47202 | 725/61 |
| 2009/0204885 A1 * | 8/2009 | Ellsworth | G06F 16/44 | 715/234 |
| 2009/0304361 A1 * | 12/2009 | Chan | H04N 21/4305 | 386/357 |
| 2009/0320084 A1 * | 12/2009 | Azam | H04N 21/26616 | 725/120 |
| 2009/0324203 A1 * | 12/2009 | Wiklof | H04N 1/00933 | 386/291 |
| 2010/0002084 A1 * | 1/2010 | Hattori | H04N 5/91 | 348/207.1 |
| 2010/0043022 A1 * | 2/2010 | Kaftan | H04N 21/235 | 725/34 |
| 2010/0075685 A1 * | 3/2010 | Axnas | H04W 72/02 | 455/450 |
| 2010/0095323 A1 * | 4/2010 | Williamson | H04N 21/812 | 725/32 |
| 2010/0186025 A1 * | 7/2010 | Thomas | H04N 21/25875 | 725/5 |
| 2010/0217613 A1 * | 8/2010 | Kelly | G06Q 30/02 | 705/1.1 |
| 2010/0218208 A1 * | 8/2010 | Holden | H04N 21/812 | 725/32 |
| 2010/0242079 A1 * | 9/2010 | Riedl | H04N 7/17318 | 725/115 |
| 2010/0246582 A1 * | 9/2010 | Salinger | H04L 12/2801 | 370/392 |
| 2010/0251304 A1 * | 9/2010 | Donoghue | H04N 21/4755 | 725/46 |
| 2010/0251305 A1 * | 9/2010 | Kimble | H04N 21/4668 | 725/46 |
| 2010/0254295 A1 * | 10/2010 | Ahn | H04N 21/6131 | 370/312 |
| 2010/0254386 A1 * | 10/2010 | Salinger | H04L 69/08 | 370/392 |
| 2010/0293583 A1 * | 11/2010 | Loebig | H04N 21/2402 | 725/109 |
| 2010/0306401 A1 * | 12/2010 | Gilson | H04N 5/783 | 709/231 |
| 2011/0138053 A1 * | 6/2011 | Khan | H04L 67/1002 | 709/226 |
| 2011/0307929 A1 * | 12/2011 | Youssefmir | H04N 21/23805 | 725/89 |
| 2012/0020307 A1 * | 1/2012 | Henderson | H04W 74/085 | 370/329 |
| 2012/0040714 A1 * | 2/2012 | Wu | H04B 1/3877 | 455/552.1 |
| 2012/0066371 A1 * | 3/2012 | Patel | H04L 67/1031 | 709/224 |
| 2012/0075168 A1 * | 3/2012 | Osterhout | G06F 3/011 | 345/8 |
| 2012/0117103 A1 * | 5/2012 | Farrelly | G06F 16/113 | 707/769 |
| 2012/0192242 A1 * | 7/2012 | Kellerer | G06F 16/7867 | 725/116 |
| 2012/0229655 A1 * | 9/2012 | Solomon | H04N 5/23225 | 348/207.1 |
| 2013/0104173 A1 * | 4/2013 | Tjio | H04H 20/55 | 725/62 |
| 2013/0133009 A1 * | 5/2013 | Bhogal | H04N 21/472 | 725/58 |
| 2014/0157336 A1 * | 6/2014 | Deegan | H04N 21/4782 | 725/91 |
| 2014/0314237 A1 * | 10/2014 | Cottrell | H04L 65/4076 | 381/2 |
| 2015/0358654 A1 * | 12/2015 | Zhang | H04N 21/4305 | 725/62 |
| 2020/0142735 A1 * | 5/2020 | Maciocco | H04L 41/0896 | |

FOREIGN PATENT DOCUMENTS

| | | |
|---|---|---|
| CN | 102185880 A | 9/2011 |
| CN | 103107951 A | 5/2013 |
| CN | 103945198 A | 7/2014 |
| CN | 104427354 A | 3/2015 |
| CN | 104580219 A | 4/2015 |
| CN | 105704501 A | 6/2016 |
| CN | 105959354 A | 9/2016 |
| CN | 106790249 A | 5/2017 |
| CN | 106850277 A | 6/2017 |
| CN | 106850581 A | 6/2017 |
| WO | 2010042041 A1 | 4/2010 |

* cited by examiner

METHOD AND SYSTEM FOR STREAMING MEDIA LIVE BROADCAST

CROSS-REFERENCE TO RELATED APPLICATION

This application is a continuation application and claims the priority to International Application No. PCT/CN2017/109585, titled "Streaming Media Live Broadcast Method and System," filed on Nov. 6, 2017, the entire content of which is incorporated herein by reference.

TECHNICAL FIELD

The present disclosure relates to the field of multimedia technology, and in particular, to a method and system for streaming media live broadcast.

BACKGROUND

Webcasts enable a user to simultaneously publish a video to a network while the video is being recorded, so other users on the network may watch in real time. In many systems, when performing a network live broadcast, it may be necessary to use an established cloud-based live broadcast platform. Users may use the cloud-based live broadcast platform to publish live broadcasts and watch live broadcasts. For example, when using an unmanned aerial vehicle (UAV) for power line inspection and other tasks, the UAV may record a video and transmit it while flying along a predetermined route. A cloud-based live broadcast platform may be used to enable users to observe image data transmitted by the UAV camera in real-time through the cloud-based live broadcast platform. However, current live webcasting platforms are generally only accessible on public networks. Due to typical user requirement in the UAV industry, image data acquired by the UAV is often of sensitive and important nature. Therefore, it is often necessary to build a live broadcast platform that can be interoperable between an internal network, a local area network, or an external network. However, for this type of live broadcast platforms, certain temporary conditions such as excessive user access may cause the live broadcast platform to have low efficiency and poor robustness, not being able to guarantee response to user request.

Therefore, ensuring security of live broadcast while guaranteeing its robustness during network live broadcast has become an important technical problem to be solved.

SUMMARY

In one aspect of the present disclosure, a streaming media live broadcast method for a load balancing layer is provided. The method may include: receiving a live broadcast request from a terminal, the live broadcast request including an up-streaming request or a down-streaming request; selecting a streaming media server from a plurality of streaming media servers; and forwarding the live broadcast request to the selected streaming media server to cause the selected streaming media server to provide a live broadcast service according to the broadcast request.

In certain embodiments, selecting a streaming media server from a plurality of streaming media servers may include: selecting a streaming media server with a remaining load capability exceeding a preconfigured threshold according to respective remaining load capacities of the plurality of streaming media servers.

In certain embodiments, the method may further include: receiving load-related information from each of the plurality of streaming media servers; and determining the remaining load capacity of each streaming media server according to the load-related information.

In certain embodiments, the load-related information may include one or more of: a network bandwidth, a remaining bandwidth, a used bandwidth, the number of up-streaming channels, the number of down-streaming channels, and an occupancy rate of a central processing unit (CPU) of a corresponding streaming media server.

In certain embodiments, the load balancing layer may include a proxy server and a load balancer; and the method may further include: receiving, by the proxy server, the live broadcast request from the terminal; forwarding, by the proxy server, the live broadcast request to the load balancer; selecting, by the load balancer, a streaming media server from the plurality of streaming media servers; and forwarding, by the load balancer, the live broadcast request to the streaming media server.

In certain embodiments, the load balancing layer may include a plurality of load balancers; and the proxy server is configured to send the live broadcast request to one of the plurality of load balancers.

In certain embodiments, the proxy server may be configured to send the live broadcast request to one of the plurality of load balancers according to a preconfigured distribution strategy, and the other load balancers may be configured as backup load balancers.

In certain embodiments, the preconfigured load distribution strategy may include one or more of: a source Internet protocol (IP) address strategy, a request type strategy, and a distribution ratio strategy.

In certain embodiments, the method may further include: according to a configuration request inputted by a user, configuring another server capable of providing a live broadcast service as the streaming media server.

In another aspect of the present disclosure, a streaming media live broadcast method for a streaming media server is provided. The method may include: receiving a live broadcast request from a terminal forwarded by a load balancing layer, wherein the live broadcast request includes an up-streaming request or a down-streaming request; and providing a live broadcast service to the terminal according to the live broadcast request.

In certain embodiments, the method may further include: sending load-related information to the load-balancing layer to cause the load-balancing layer to determine a remaining load capacity according to the load-related information.

In certain embodiments, the streaming media server may periodically send the load-related information to the load balancing layer.

In certain embodiments, the streaming media server may include a main streaming media server and a backup streaming media server to perform disaster recovery protection for the live broadcast service.

In certain embodiments, when the live broadcast request is an up-streaming request, the method may further include: storing data corresponding to the up-streaming request.

In certain embodiments, the data may be stored in one or more of a public cloud, a private cloud, and a local device.

In another aspect of the present disclosure, a streaming media live broadcast system is provided for a load balancing layer. The system may include: a communication interface configured to receive a live broadcast request from a terminal, wherein the live broadcast request includes an up-streaming request or a down-streaming request; a first processor configured to select a streaming media server from a plurality of streaming media servers to process the live broadcast request. The communication interface may be further configured to forward the live broadcast request to the selected streaming media server to cause the streaming media server to provide a live broadcast service to the terminal according to the live broadcast request.

In certain embodiments, the first processor may be configured to select, according to a remaining load capacity of each of the plurality of streaming media servers, a streaming media server whose remaining load capacity exceeds a preconfigured threshold to process the live broadcast request.

In certain embodiments, the communication interface may be further configured to receive load-related information from each of the plurality of streaming media servers; and the first processor is further configured to determine the remaining load capacity of each streaming media server according to the load-related information of the streaming media server.

In certain embodiments, the load-related information may include one or more: a network bandwidth, a remaining bandwidth, a used bandwidth, the number of up-streaming channels, the number of down-streaming channels, and an occupancy rate of a central processing unit (CPU) of a corresponding streaming media server.

In certain embodiments, the first processor may be further configured to configure another server capable of providing a live broadcast service as the streaming media server according to a configuration request inputted by a user.

The above aspects will be explained in detail with accompanying drawings.

BRIEF DESCRIPTION OF THE DRAWINGS

In order to more clearly explain the embodiments of the present, the drawings used in the description of the embodiments will be briefly introduced below. These drawings only depict some of the embodiments of the present disclosure. For those of ordinary skill in the art, other drawings can be obtained based on these drawings without creative endeavor.

DETAILED DESCRIPTION OF THE EMBODIMENTS

The technical solutions according to the embodiments of the present disclosure will be described with reference to the accompanying drawings. The described embodiments are a part, but not all, of the embodiments of the present disclosure. Based on the described embodiments, all other embodiments obtained by a person of ordinary skill in the art without creative efforts shall fall within the scope of the present disclosure.

Some embodiments of the present disclosure will be described in detail with reference to the drawings. When there is no conflict, the embodiments and features in the following description may be combined with each other.

Figure 1:
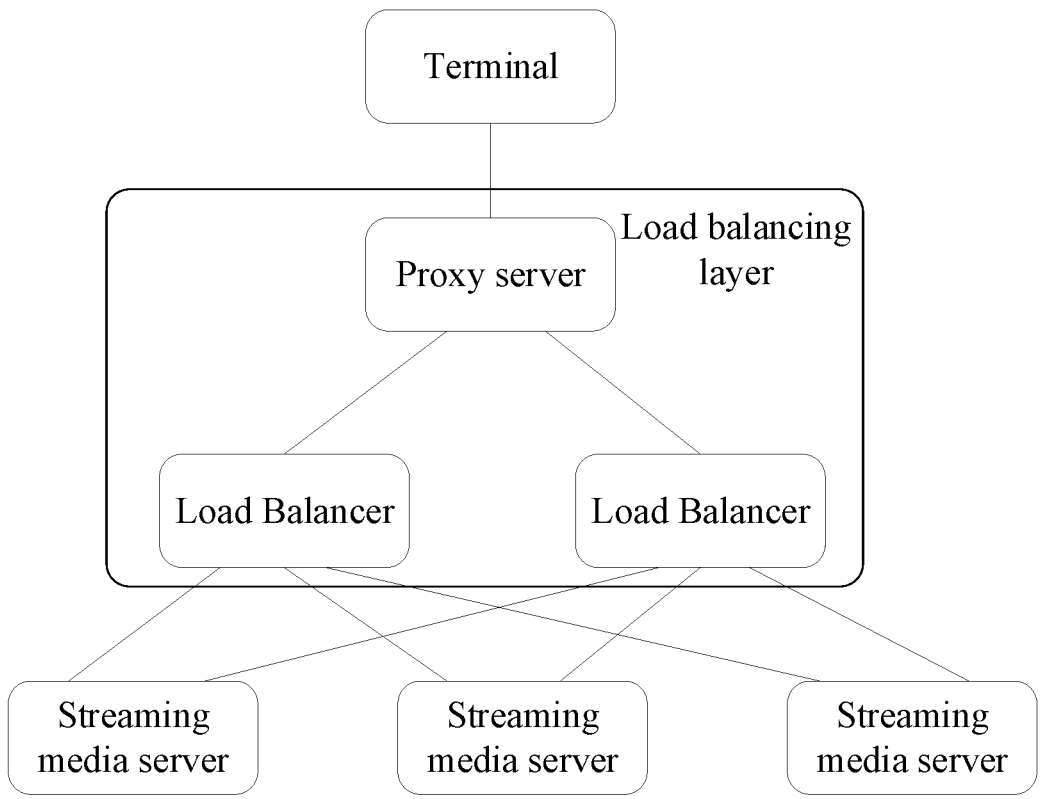
FIG. 1 is a schematic diagram of a system for providing a streaming media live broadcast method according to certain embodiments of the present disclosure.

FIG. 1 is a schematic diagram of a system for providing a streaming media live broadcast method application according to certain embodiments. As shown in FIG. 1, the system may include a terminal, a load balancing layer, and at least two streaming media servers. The terminal may communicate with the load balancing layer, and the load balancing layer may communicate with the streaming media servers. The terminal may be one or more of a smart phone, a remote control, a tablet computer, a laptop computer, and a wearable device (e. g., a watch or a bracelet). The load balancing layer may perform a load balancing function related to a live broadcast service. Specifically, the load balancing layer may receive a live broadcast request sent by the terminal, such as an up-streaming request or a down-streaming request, select a streaming media server from the at least two streaming media servers to process the live broadcast request, and forward the broadcast request to the selected streaming media server. A streaming media server may be a server capable of providing a live broadcast service, such as a Wowza streaming media server, which is not limited in the present disclosure. Here, up streaming refers to the terminal pushing a locally collect voice stream or video stream to a streaming media server. Down Streaming refers to the terminal pulling voice or video streams from a streaming media server.

The load balancing layer may include one device or multiple devices, which is not limited in the present disclosure. Optionally, the load balancing layer may include a proxy server. In this case, the proxy server may perform receiving a live broadcast request, selecting a streaming media server that processes the live broadcast request, and forwarding the live broadcast request to the selected streaming media server.

Alternatively, optionally, as shown in FIG. 1, the load balancing layer may include a proxy server and a load balancer. In this case, the proxy server may perform the function of receiving a live broadcast request, and further forwarding the received live broadcast request to the load balancer. The load balancer may perform selecting the streaming media server that processes the live broadcast request and forwarding the live broadcast request to the selected streaming media server. By using the proxy server and the load balancer, the load balancing layer may hide address information of the server that performs task processing, that is, the address information of the load balancer, to prevent the actual task processing from being attacked by hackers, and thus improving security.

Further optionally, as shown in FIG. 1, the number of load balancers may be multiple. The multiple load balancers may implement a load sharing function or a disaster recovery function. For the disaster recovery function, multiple load balancers may communicate with all streaming media servers. For each load balancer among multiple load balancers, other load balancers may serve as backup load balancers. As for the load sharing function, the ratios of load sharing among multiple load balancers may be configured during regular operation. For example, the load sharing ratio between Load Balancer 1 and Load Balancer 2 may be 1:1. During normal operation, Load Balancer 1 and Load Balancer 2 may each share 50% of the load, respectively. In another example, the load sharing ratio between Load Balancer 1 and Load Balancer 2 may be 1:0. Load Balancer 1 may share 100% (that is, all) of the load, and Load Balancer 2 may be only used as a backup load balancer. In FIG. 1, the number of load balancers is two, and the number of streaming media servers is three as an example.

Figure 2:
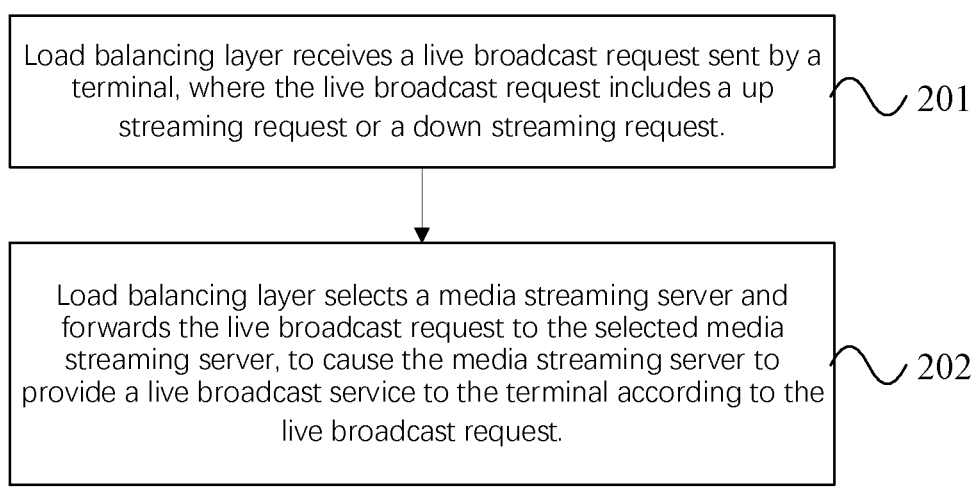
FIG. 2 is a flowchart of a streaming media live broadcast method according to certain embodiments of the present disclosure.

FIG. 2 is a flowchart of a streaming media live broadcast method according to certain embodiments. As shown in FIG. 2, the method may include the following steps.

In Step 201, a load balancing layer receives a live broadcast request sent by a terminal, where the live broadcast request includes an up-streaming request or a down-streaming request.

In this step, a communication interface of the load balancing layer may receive a live broadcast request sent by the terminal. When a user enables a live publishing function of the terminal, the terminal may send an up-streaming request to the load balancing layer. At this time, the load balancing layer may receive the up-streaming request sent by the terminal. When the user turns on the live broadcast function of the terminal, the terminal may send a down-streaming request to the load balancing layer, and the load balancing layer may receive the down-streaming request sent by the terminal. Optionally, when the load balancing layer includes a proxy server, the communication interface of the proxy server may receive the live broadcast request sent by the terminal.

In Step 202, the load balancing layer selects a streaming media server from the at least two streaming media servers to process the live broadcast request, and forwards the live broadcast request to the selected streaming media server, so that the streaming media server may provide a live broadcast service to the terminal according to the live broadcast request.

In this step, the at least two streaming media servers may provide a live broadcast service. The load balancing layer may select one of the streaming media servers as a streaming media server that processes the live broadcast request. The load balancing layer may select a streaming media server from multiple streaming media servers to process the live broadcast request, so that when a certain streaming media server fails, other streaming media servers may provide live broadcast services, thereby ensuring robustness of the live broadcast. Further, the load balancing layer may select a streaming media server from multiple streaming media servers to process the live broadcast request to implement load sharing function. Load balancing may be achieved by the load balancing layer selecting the streaming media server that processes live broadcast requests from multiple streaming media servers. Specifically, the load balancing layer may select a streaming media server from at least two streaming media servers to process the live broadcast request according to a round robin strategy to implement load balancing of the at least two streaming media servers. Alternatively, the load balancing layer may select a streaming media server from the at least two streaming media servers to process the live broadcast request according to a load balancing strategy to implement load balancing of the at least two streaming media servers.

In this step, the live broadcast request may be forwarded to the selected streaming media server through a communication interface of the load balancing layer. Optionally, when the streaming media server that handles the live broadcast request includes a proxy server, the live broadcast request may be forwarded to the selected streaming media server through the communication interface of the proxy server. When the streaming media server that handles the live broadcast request selected by the load balancer includes a proxy server, the live broadcast request may be forwarded to the selected streaming media server through the communication interface of the load balancer server.

In certain embodiments, by receiving a live broadcast request sent by a terminal, the load balancing layer may select a streaming media server from at least two streaming media servers to process the live broadcast request, and forward the live broadcast request to the selected streaming media server, so that the streaming media server may provide a live broadcast service to the terminal according to the live broadcast request. Thus, the live broadcast request sent by the terminal may be forwarded to one of a plurality of streaming media servers, so that the streaming media server may provide users with live broadcast function, avoiding problem of low security in live broadcasting due to unknown and uncontrollable properties of existing cloud-based live broadcast platforms, and improving the security of the live broadcast. Further, the load balancing layer may select the streaming media server from at least two streaming media servers to process the live broadcast request, so that when a certain streaming media server fails, other streaming media servers may provide the live broadcast service, thereby ensuring the robustness of the live broadcast. Therefore, the method provided in these embodiments may ensure the security of the live broadcast while ensuring the robustness of the live broadcast.

The communication network between the load balancing layer, the terminal, and the streaming media server may include a public network or an internal network, which is not limited in the present disclosure. When the communication network between the load balancing layer, the terminal, and the streaming media server is an internal network, it may prevent devices in an external network from illegally accessing the terminal, the load balancing layer, and the streaming media server, thereby further improving security.

Figure 3:
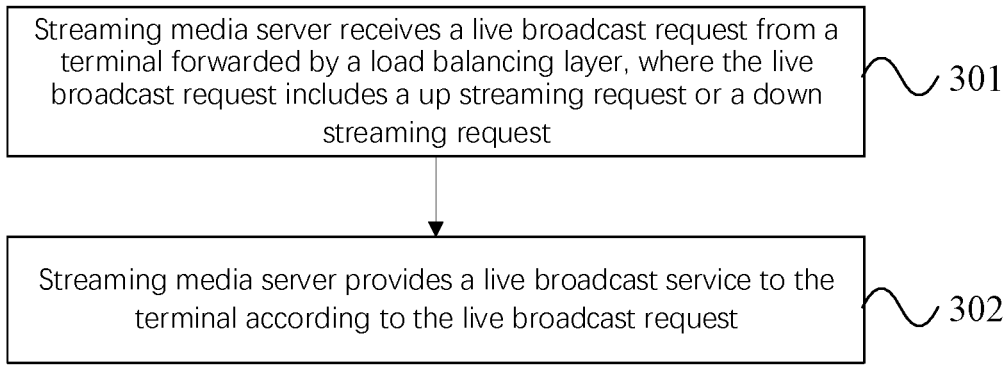
FIG. 3 is a flowchart of a streaming media live broadcast method according to certain other embodiments of the present disclosure.

FIG. 3 is a flowchart of a streaming media live broadcast method according to certain other embodiments. As shown in FIG. 3, the method in these embodiment may include the following steps.

In Step 301, a streaming media server receives a live broadcast request from a terminal forwarded by a load balancing layer, where the live broadcast request includes an up-streaming request or a down-streaming request.

In this step, a communication interface of the streaming media server may receive the live broadcast request from the terminal forwarded by the load balancing layer. Specifically, the communication interface of the streaming media server may receive the live broadcast request of the terminal forwarded by a proxy server or a communication interface of the load balancer. The streaming media server may be the streaming media server selected by the load balancing layer from at least two streaming media servers.

In Step 302, the streaming media server provides a live broadcast service to the terminal according to the live broadcast request.

In this step, the live broadcast service may be a live broadcast publishing service or a live broadcast viewing service. When the live broadcast request is an up-streaming request, the streaming media server may provide a live broadcast publishing service to the terminal. The terminal may push the locally collected voice stream or video stream to the streaming media server. When the live broadcast request is a streaming request, the streaming media server may provide the terminal with a live broadcast viewing service. The terminal may pull a voice stream or a video stream from the streaming media server.

In certain embodiments, by receiving a live broadcast request from a terminal and forwarded by a load balancing layer, and the streaming media server may provide a live broadcast service to the terminal according to the live broadcast request, so that the streaming media server may provide users with live broadcast function of a live broadcast service according to the live broadcast request sent by the terminal, avoiding problem of low security in live broadcasting due to unknown and uncontrollable properties of existing cloud-based live broadcast platforms, and improving the security of the live broadcast. Further, the load balancing layer may select the streaming media server from at least two streaming media servers, which receives the live broadcast request from a terminal and forwarded by a load balancing layer, so that when a certain streaming media server fails, other streaming media servers may provide the live broadcast service, thereby ensuring the robustness of the live broadcast. Therefore, the method provided in these embodiments may ensure the security of the live broadcast while ensuring the robustness of the live broadcast.

Figure 4:
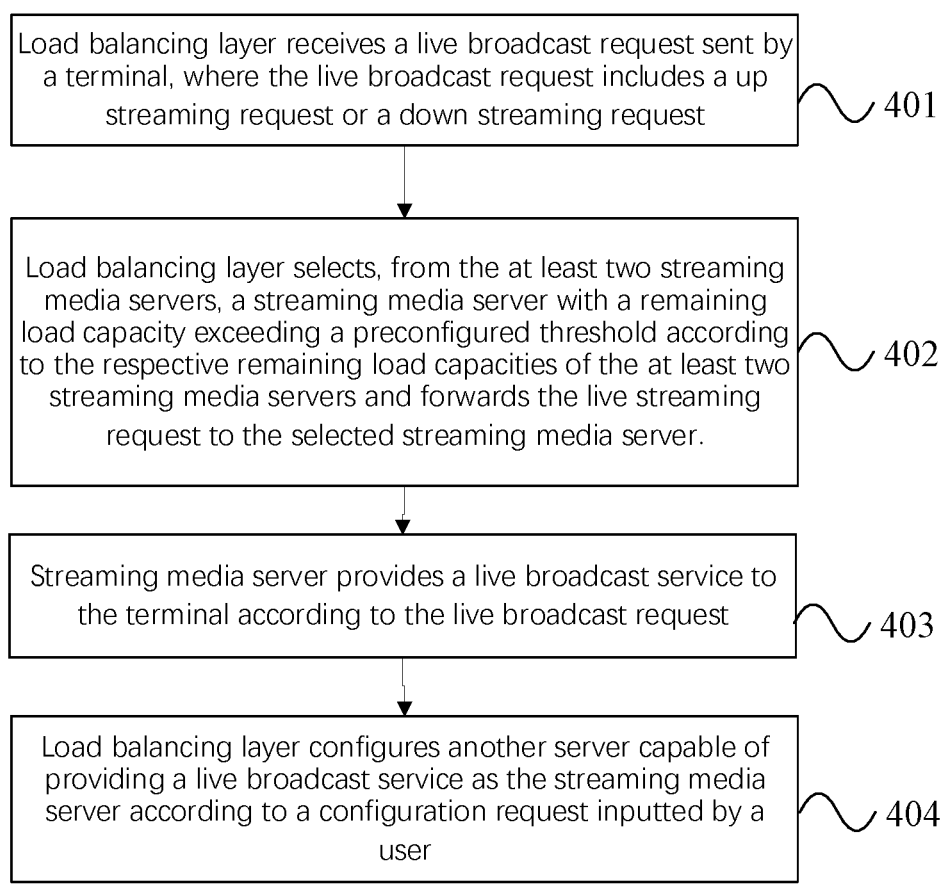
FIG. 4 is a flowchart of a streaming media live broadcast method according to certain other embodiments of the present disclosure.

FIG. 4 is a flowchart of a streaming media live broadcast method according to certain other embodiments. FIG. 4 describes an interaction process between the load balancing layer and the streaming media server on the basis of the embodiments shown in FIG. 1 and FIG. 2. As shown in FIG. 4, the method in these embodiments may include the following steps.

In Step 401, the load balancing layer receives a live broadcast request sent by a terminal, where the live broadcast request includes an up-streaming request or a down-streaming request. Step 401 is similar to step 201, and details are not repeated herein.

In Step 402, the load balancing layer selects, from the at least two streaming media servers, a streaming media server with a remaining load capacity exceeding a preconfigured threshold according to the respective remaining load capacities of the at least two streaming media servers to process the live streaming request and forwards the live streaming request to the selected streaming media server.

In this step, when the number of streaming media servers whose remaining load capacity exceeds a preconfigured threshold is greater than 1, a streaming media server may be randomly selected from the plurality of streaming media servers whose remaining load capacity exceeds the preconfigured threshold to process the live broadcast. Alternatively, a streaming media server with the largest remaining load capacity among the plurality of streaming media servers with a remaining load capacity exceeding a preconfigured threshold may be selected as the streaming media server for processing the live broadcast request. The present disclosure does not limit the manner of choosing the streaming media server. The preconfigured threshold may be configured according to a practical application. In order to ensure the quality of viewing a video, a preconfigured threshold may be configured to a larger value. In order to maximize the use of the bandwidth of the streaming media server, the preconfigured threshold may be configured to a smaller value. In order to ensure the quality is acceptable and maximize the bandwidth of the streaming media server, the preconfigured threshold may be configured to a suitable value between the larger value and the smaller value.

Optionally, before step 402, the following steps A and B may be further included to determine the respective remaining load capacities of the at least two streaming media servers.

In Step A, the at least two streaming media servers send load-related information to the load balancing layer, respectively. The at least two streaming media servers may actively send load-related information to the load balancing layer, or the at least two streaming media servers may passively send load-related inform to the load balancing layer when requested by the load balancing layer. Optionally, the streaming media servers may periodically send the load-related information to the load balancing layer. For example, the streaming media servers may send the load-related information to the load balancing layer every 1 minute.

In Step B, the load balancing layer determines the remaining load capacity of each of the at least two streaming media servers according to the load-related information of the at least two streaming media servers. The load-related information may include one or more of: network bandwidth, remaining bandwidth, used bandwidth, number of up streaming channels, number of down-streaming channels, and occupancy rate of central processing unit (CPU). The network bandwidth, remaining bandwidth, and used bandwidth are for the load balancing layer to obtain the remaining bandwidth of the streaming media server. When the load-related information includes the network bandwidth and the used bandwidth, the load balancing layer may calculate and obtain the remaining bandwidth according to the network bandwidth and the used bandwidth. When the load-related information includes the used bandwidth, the load balancing layer can calculate and obtain the remaining bandwidth based on the used bandwidth and a pre-stored network bandwidth. When the load-related information includes the network bandwidth, the load balancing layer can calculate and obtain the remaining bandwidth based on the network bandwidth and the used bandwidth obtained by performing traffic detection on the streaming media server. When the load balancing layer determines the remaining load capacity based on two or more of the remaining bandwidth, number of up streaming channels, number of down-streaming channels, and CPU occupancy rate, the remaining bandwidth, number of up streaming channels, number of down-streaming channels, and CPU occupancy rate may be considered with different weights.

When a load balancer of the load balancing layer selects a streaming media server for the live broadcast request, the at least two streaming media servers may send load-related information to the load balancer, respectively. The load balancer may then determine the remaining load capacity of each of the at least two streaming media servers according to the load-related information of the at least two streaming media servers.

In certain embodiments, the remaining load capacity may be determined by the load balancing layer. Optionally, other devices outside the load balancing layer may also be used to determine the remaining load capacity of the streaming media servers. The determined remaining load capacity may then be sent to the load balancing layer. The device for determining the remaining load capacity of the streaming media servers is not limited in the present disclosure.

In Step 403, the streaming media server provides a live broadcast service to the terminal according to the live broadcast request.

In this step, the streaming media servers may include a main streaming media server and a backup streaming media server to perform disaster recovery protection for the live broadcast service. Under normal circumstances, the main streaming media server may be responsible for the live broadcast service, and the backup streaming media server may be on standby. Once the main streaming media server is down or in other unexpected situations, the live streaming service may be automatically taken over by the backup streaming media server. The streaming media server includes a main streaming media server and a backup streaming media server to protect the live broadcast service from faults, making the live broadcast service fault tolerant, and thus making the streaming live broadcast system robust.

Optionally, for an up-streaming request, the streaming media server may also provide a recording function. When the live broadcast request is an up-streaming request, the streaming media server may store data corresponding to the up-streaming request. The data corresponding to the up-streaming request may be voice data, video data, and the like. When the data is stored, the data may be stored in one or more of a public cloud, a private cloud, and a local device. By storing data in one or more of public cloud, private cloud, and local, the storage of recorded data during live broadcast may be more flexible. At present, cloud platforms such as Tencent Cloud or Alibaba Cloud have a relatively large architecture and take a long time to start recording, so they may not support short-term recording and may not quickly generate recorded content. For example, Tencent Cloud and Alibaba Cloud cannot support recording within two minutes, and the recorded content is generated 2-3 minutes after the recording ends. In contrast, by storing the data locally, a user may record for any length of time in real time, and immediately after recording ends, the recorded content may be generated for users to view.

Optionally, when the live broadcast service continuously increases, a new streaming media server may be added to the streaming media live broadcast system shown in FIG. 1 through the following step 404.

In Step 404, the load balancing layer configures another server capable of providing a live broadcast service as the streaming media server according to a configuration request inputted by a user.

In this step, the load balancing layer may add identifiers of other servers capable of providing a live broadcast service to an existing set of streaming media servers according to a configuration request inputted by a user. The set of streaming media servers may include the identifiers of all the streaming media servers. When receiving a live broadcast request, the load balancing layer may select a streaming media server that processes the live broadcast request according to the set of streaming media servers.

The present disclosure does not limit the order or sequence between step 404 and step 401-step 403.

When a load balancer of the load balancing layer selects a streaming media server for the live broadcast request, the load balancer may, according to the configuration request inputted by the user, configure other servers capable of providing live broadcast services as the streaming media servers.

In certain embodiment, according to the respective remaining load capacities of the at least two streaming media servers, the load balancing layer may select, from the at least two streaming media servers, a streaming media server with a remaining load capacity exceeding a preconfigured threshold to process the live streaming request and forward the live streaming request to the selected streaming media server. This realizes load balancing based on remaining load capacity of the streaming media servers, thereby improving the performance of the live broadcast.

Figure 5:
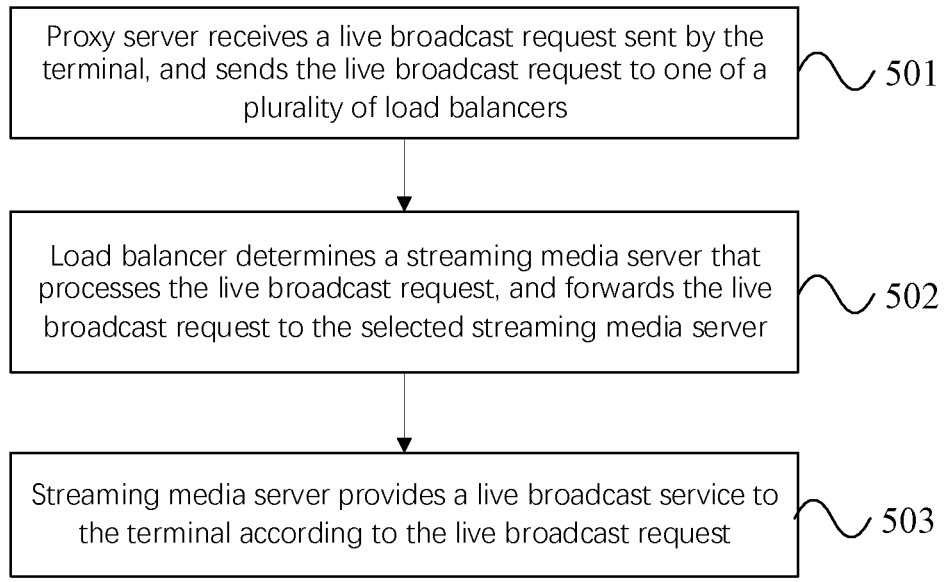
FIG. 5 is a flowchart of a streaming media live broadcast method according to certain other embodiments of the present disclosure.

FIG. 5 is a flowchart of a streaming media live broadcast method according to certain other embodiments. Based on the embodiments shown in FIG. 3, FIG. 5 describes an implementation manner when the load balancing layer includes a proxy server and multiple load balancers. As shown in FIG. 5, the method may include the following steps.

In Step 501, a proxy server receives a live broadcast request sent by the terminal, and sends the live broadcast request to one of a plurality of load balancers.

In this step, a communication interface of a proxy server may receive a live broadcast request sent by the terminal. Optionally, the proxy server may send the live broadcast request to a specific one of the plurality of load balancers. The other load balancers in the multiple load balancers may be used as backup load balancers. Optionally, the proxy server may randomly send the live broadcast request to one of the multiple load balancers. The proxy server may send the live broadcast request to one of multiple load balancers according to a preconfigured load distribution strategy. The other load balancers may serve as backup load balancers on the basis of completing the load balancing function. In this step, other load balancers may be used as backup load balancers to make the load balancing function fault-tolerant, thereby further improving the robustness of the streaming media live broadcast system.

Optionally, the preconfigured load distribution strategy may include one or more of: a source Internet Protocol (IP) address strategy, a request type strategy, and a distribution ratio strategy. Assume that the number of load balancers is 2. For the source IP address strategy, it may be specified that a live broadcast request with a source IP address belonging to an IP address range "a" may be sent to Load Balancer 1. A live broadcast request with a source IP address belonging to an IP address range "b" may be sent to Load Balancer 2. For the request type strategy, it may be specified that a live broadcast request whose request type is an up-streaming request is sent to Load Balancer 1 and a live broadcast request whose request type is a down-streaming request is sent to Load Balancer 2. For the distribution ratio strategy, it may be specified that a live broadcast request is sent to Load Balancer 1 or Load Balancer 2 according to a preconfigured ratio.

In Step 502, the load balancer determines a streaming media server that processes the live broadcast request, and forwards the live broadcast request to the selected streaming media server.

For a specific manner for the load balancer to determine the streaming media server that processes the live broadcast request, reference may be made to the related descriptions in Step 202 and Step 402, and details are not repeated herein.

In Step 503, the streaming media server provides a live broadcast service to the terminal according to the live broadcast request.

Step 503 is similar to step 403 and step 302, and is not repeated herein.

In certain embodiment, a proxy server may receive a live broadcast request from a terminal, and send the live broadcast request to one of a plurality of load balancers. The load balancer may determine a streaming media server that processes the live broadcast request and forward the live broadcast request to the streaming media server. Other load balancers may serve as backup load balancers, making the load balancing function fault-tolerant, thereby further improving the robustness of the streaming media live broadcast system.

Figure 6:
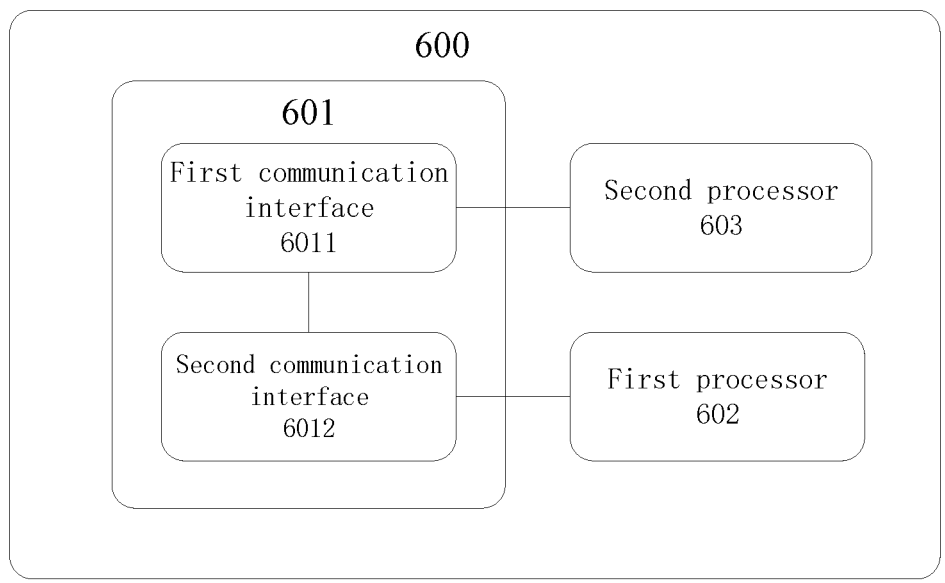
FIG. 6 is a schematic diagram of a streaming media live broadcast system according to certain embodiments of the present disclosure.

Certain embodiments of the present disclosure provide a streaming media live broadcast system. The streaming media live broadcast system in these embodiments may be applied to a load balancing layer. FIG. 6 is a schematic structural diagram of a streaming media live broadcast system according to certain embodiments of the present disclosure. As shown in FIG. 6, the streaming media live broadcast system 600 may include: a communication interface 601 and a first processor 602.

The communication interface 601 is configured to receive a live broadcast request sent by a terminal, where the live broadcast request may include an up-streaming request or a down-streaming request.

The first processor 602 is configured to select a streaming media server from at least two streaming media servers to process the live broadcast request.

The communication interface 601 may be further configured to forward the live broadcast request to the selected streaming media server, so that the streaming media server may provide a live broadcast service to the terminal according to the live broadcast request.

Optionally, the first processor 602 may be configured to select from the at least two streaming media servers, according to respective remaining load capacity of the at least two streaming media servers, a streaming media server whose remaining load capacity exceeds a preconfigured threshold. The selected server is a streaming media server that processes the live broadcast request.

Optionally, the communication interface 601 may be further configured to receive load-related information sent by the at least two streaming media servers, respectively.

The first processor 602 may be further configured to determine the remaining load capacity of each of the at least two streaming media servers according to the load-related information of the at least two streaming media servers.

Optionally, the load-related information may include one or more of a network bandwidth, a remaining bandwidth, a used bandwidth, the number of up-streaming channels, the number of down-streaming channels, and a CPU occupation rate.

Optionally, the load balancing layer 600 may include a proxy server and a load balancer. The communication interface 601 may include a first communication interface 6011 and a second communication interface 6012. The proxy server may include the first communication interface 6011. The load balancer may include the second communication interfaces 6012 and the first processor 602.

The first communication interface 6011 may be configured to receive the live broadcast request sent by the terminal, and forward the live broadcast request to the load balancer.

The second communication interface 6012 may be configured to forward the live broadcast request to the streaming media server.

Optionally, there may be multiple load balancers. The proxy server may further include: a second processor 603, configured to determine one of the multiple load balancers to send the live broadcast request to.

Optionally, the second processor 603 may be configured to determine one of the plurality of load balancers to send the live broadcast request to, according to a preconfigured load distribution strategy. The other load balancers may serve as backup load balancers.

Optionally, the preconfigured load distribution strategy may include one or more of a source Internet protocol IP address strategy, a request type strategy, and a distribution ratio strategy.

Optionally, the first processor 602 may be further configured to configure another server capable of providing a live broadcast service as the streaming media server according to a configuration request inputted by a user.

The streaming media live broadcast system may be used to execute the streaming media live broadcast method of the embodiment shown in FIG. 2 in the foregoing embodiments, and the technical solutions of the load balancing layer side of the streaming media live broadcast method of the embodiments shown in FIGS. 4 and 5. The implementation principles and technologies may be referred to the relevant portions of the forgoing descriptions, and are not repeated herein.

Figure 7:
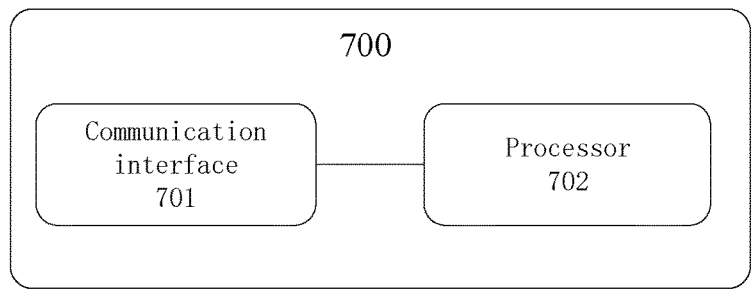
FIG. 7 is a schematic diagram of a streaming media live broadcast system according to certain other embodiments of the present disclosure.

Embodiments of the present disclosure also provide a streaming media live broadcast system. The streaming media live broadcast system may be applied to a streaming media server. FIG. 7 is a schematic structural diagram of a streaming media live broadcast system provided by certain other embodiments. As shown in FIG. 7, the streaming media live broadcast system 700 may include a communication interface 701 and a processor 702.

The communication interface 701 is configured to receive a live broadcast request from a terminal forwarded by a load balancing layer, where the live broadcast request may include an up-streaming request or a down-streaming request.

The processor 702 may be configured to provide a live broadcast service to the terminal according to the live broadcast request.

Optionally, the communication interface 701 may be further configured to send load-related information to the load balancing layer, so that the load balancing layer may determine a remaining load capacity according to the load-related information.

Optionally, the communication interface 701 may be configured to periodically send the load-related information to the load balancing layer.

Optionally, the streaming media servers may include a main streaming media server and a backup streaming media server to provide disaster recovery protection for the live broadcast service.

Optionally, when the live broadcast request is an up-streaming request, the processor 702 may be further configured to store data corresponding to the up-streaming request.

Optionally, the processor 702 may be specifically configured to store the data in one or more of a public cloud, a private cloud, and a local device.

The streaming media live broadcast system may be used to execute the streaming media live broadcast method shown in FIG. 3 in the foregoing descriptions, and the technical solutions of the load balancing layer side of the streaming media live broadcast method shown in FIGS. 4 and 5. The implementation principles and technologies may be referred to the relevant portions of the forgoing descriptions, and are not repeated herein.

Figure 8:
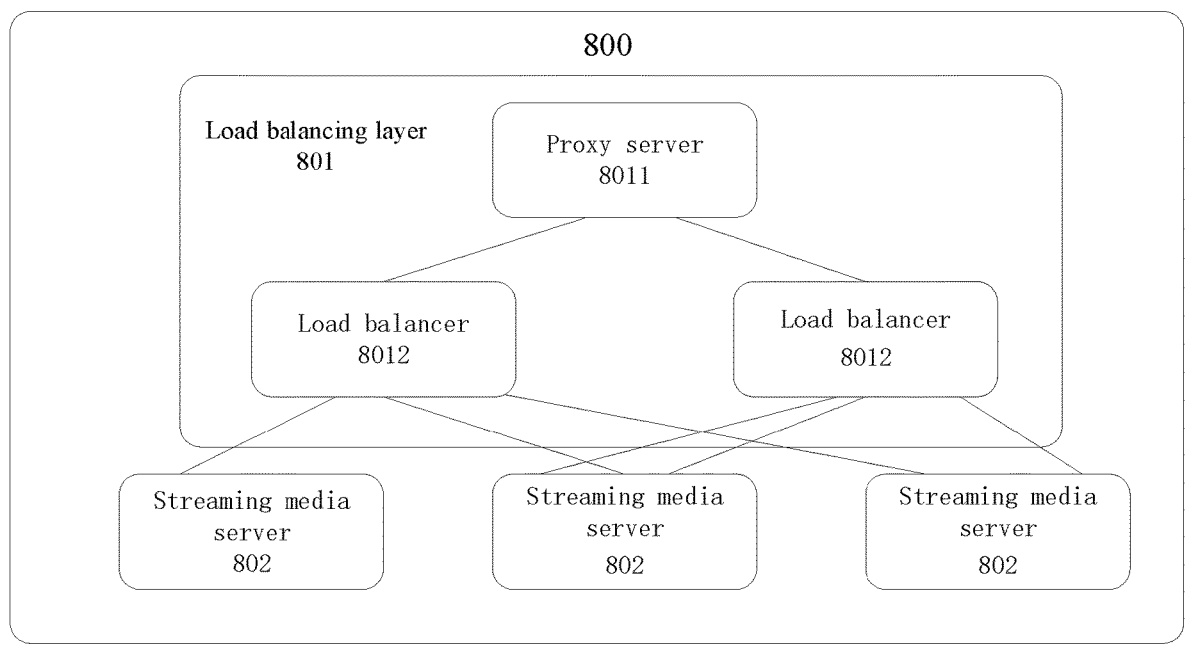
FIG. 8 is a schematic diagram of a streaming media live broadcast system according to certain other embodiments of the present disclosure.

The present disclosure also provides a streaming media live broadcast system. FIG. 8 is a schematic structural diagram of a streaming media live broadcast system according to certain other embodiments. As shown in FIG. 8, the streaming media live broadcast system 800 may include a load balancing layer 801 and at least two streaming media servers 802.

The load balancing layer 801 may be configured to receive a live broadcast request sent by a terminal.

The load balancing layer 801 may be further configured to select, from at least two streaming media servers 802, a streaming media server that processes the live broadcast request, and forward the live broadcast request to the selected streaming media server;

The streaming media server 802 may be configured to provide a live broadcast service to the terminal according to the live broadcast request.

Optionally, the load-balancing layer 801 may be configured to select from the at least two streaming media servers, according to respective remaining load capacity of the at least two streaming media servers, a streaming media server whose remaining load capacity exceeds a preconfigured threshold. The selected server is a streaming media server that processes the live broadcast request.

Optionally, at least two streaming media servers 802 may be further configured to send load-related information to the load balancing layer 801, respectively.

The load balancing layer 801 may be further configured to determine the remaining load capacity of each of the at least two streaming media servers 802 according to the load-related information of the at least two streaming media servers 802.

Optionally, the at least two streaming media servers 802 may be configured to periodically send the load-related information to the load balancer.

Optionally, the load-related information may include one or more of a network bandwidth, a remaining bandwidth, a used bandwidth, the number of up-streaming channels, the number of down-streaming channels, and a CPU occupation rate.

Optionally, the load balancing layer 801 may include a proxy server 8011 and a load balancing server 8012.

The proxy server 8011 may be configured to receive a live broadcast request sent by a terminal, and forward the live broadcast request to the load balancer 8012.

The load balancer 8012 may be configured to select, from at least two streaming media servers 802, a streaming media server that processes the live broadcast request, and forward the live broadcast request to the selected streaming media server.

Optionally, there are multiple load balancers 8012.

The proxy server 8011 may be configured to send the live broadcast request to one of the multiple load balancers 8012.

Optionally, the proxy server 8011 may be configured to send the live broadcast request to one of multiple load balancers 8012 according to a preconfigured load distribution strategy. The other load balancers may serve as backup load balancers Optionally, the preconfigured load distribution strategy may include one or more of a source IP address strategy, a request type strategy, and a distribution ratio strategy.

Optionally, the load balancing layer 801 may be further configured to configure another server capable of providing a live broadcast service as a streaming media server 802 according to a configuration request inputted by a user.

Optionally, the streaming media server 802 may include a main streaming media server and a backup streaming media server to provide disaster recovery protection for the live broadcast service.

Optionally, when the live broadcast request is an up-streaming request, the streaming media server 802 may be further configured to store data corresponding to the up-streaming request.

Optionally, the streaming media server 802 may be configured to store the data to one or more of a public cloud, a private cloud, and a local device.

In FIG. 8, the number of load balancers is 2 and the number of streaming media servers is 3 as an example.

The streaming media live broadcast system provided by these embodiments may be used to implement the technical solution of the streaming media live broadcast method shown in FIG. 2 to FIG. 5 in the foregoing description. For implementation principles and technologies, refer to the foregoing related parts for details, and are not repeated herein.

A person of ordinary skill in the art may understand that all or part of the steps of implementing the foregoing method embodiments may be implemented by a program instructing related hardware. The program may be stored in a computer-readable storage medium. When the program is executed, the steps including the foregoing method embodiments may be executed. The foregoing storage medium may include various media that can store program codes, such as a ROM, a RAM, a magnetic disk, or an optical disc.

The above embodiments are only used to illustrate the technical solution of the present disclosure, but are not limited thereto. Although the present disclosure has been described in detail with reference to the foregoing embodiments, those skilled in the art should understand that the technical solutions described in the foregoing embodiments may be modified, or some or all of the technical features may be equivalently replaced; and these modifications or replacements do not deviate from the principles of the disclosure and are within the scope of the present disclosure.

What is claimed is:

1. A streaming media live broadcast method for a load balancing layer, comprising:
   receiving, by a proxy server of the load balancing layer, a live broadcast request from a terminal, the live broadcast request including an up-streaming request or a down-streaming request;
   forwarding, by the proxy server, the live broadcast request to a load balancer of the load balancing layer;
   selecting, by the load balancer, a streaming media server from a plurality of streaming media servers; and
   forwarding, by the load balancer, the live broadcast request to the selected streaming media server to cause the selected streaming media server to provide a live broadcast service to the terminal according to the broadcast request.

2. The method according to claim 1, wherein selecting a streaming media server from a plurality of streaming media servers comprises:
   selecting a streaming media server with a remaining load capability exceeding a preconfigured threshold according to respective remaining load capacities of the plurality of streaming media servers.

3. The method according to claim 2, further comprising:
   receiving load-related information from each of the plurality of streaming media servers; and
   determining the remaining load capacity of each streaming media server according to the load-related information.

4. The method according to claim 3, wherein the load-related information comprises one or more of: a network bandwidth, a remaining bandwidth, a used bandwidth, a number of up-streaming channels, a number of down-streaming channels, and an occupancy rate of a central processing unit (CPU) of a corresponding streaming media server.

5. The method according to claim 1, wherein:
the load balancing layer includes a plurality of load balancers; and
the proxy server is configured to send the live broadcast request to one of the plurality of load balancers.

6. The method according to claim 5, wherein:
the proxy server is configured to send the live broadcast request to one of the plurality of load balancers according to a preconfigured distribution strategy, and the other load balancers are configured as backup load balancers.

7. The method according to claim 6, wherein the preconfigured load distribution strategy comprises one or more of: a source Internet protocol (IP) address strategy, a request type strategy, and a distribution ratio strategy.

8. The method according to claim 1, further comprising:
according to a configuration request inputted by a user, configuring another server capable of providing a live broadcast service as the streaming media server.

9. A streaming media live broadcast method for a streaming media server, comprising:
receiving a live broadcast request from a terminal forwarded by a load balancer of a load balancing layer, wherein:
the streaming media server is selected by the load balancer from a plurality of streaming media servers;
the live broadcast request is received by a proxy server of the load balancing layer and forwarded to the load balancer; and
the live broadcast request includes an up-streaming request or a down-streaming request; and
providing a live broadcast service to the terminal according to the live broadcast request.

10. The method according to claim 9, further comprising:
sending load-related information to the load-balancing layer to cause the load-balancing layer to determine a remaining load capacity according to the load-related information.

11. The method according to claim 10, wherein the streaming media server periodically sends the load-related information to the load balancing layer.

12. The method according to claim 9, wherein the streaming media server comprises a main streaming media server and a backup streaming media server to perform disaster recovery protection for the live broadcast service.

13. The method according to claim 9, wherein when the live broadcast request is an up-streaming request, the method further comprises: storing data corresponding to the up-streaming request.

14. The method according to claim 13, wherein the data is stored in one or more of a public cloud, a private cloud, and a local device.

15. A streaming media live broadcast system for a load balancing layer, comprising:
a proxy server; and
a load balancer;
wherein:
the proxy server is configured to:
receive a live broadcast request from a terminal, wherein the live broadcast request includes an up-streaming request or a down-streaming request; and
forward the live broadcast request to the load balancer; and
the load balancer is configured to:
select a streaming media server from a plurality of streaming media servers to process the live broadcast request; and
forward the live broadcast request to the selected streaming media server to cause the streaming media server to provide a live broadcast service to the terminal according to the live broadcast request.

16. The system according to claim 15, wherein:
the load balancer is further configured to select, according to a remaining load capacity of each of the plurality of streaming media servers, a streaming media server with the remaining load capacity exceeding a preconfigured threshold to process the live broadcast request.

17. The system of claim 16, wherein:
the proxy server is further configured to receive load-related information from each of the plurality of streaming media servers; and
the load balancer is further configured to determine the remaining load capacity of each streaming media server according to the load-related information of the streaming media server.

18. The system according to claim 17, wherein the load-related information includes one or more: a network bandwidth, a remaining bandwidth, a used bandwidth, a number of up-streaming channels, a number of down-streaming channels, and an occupancy rate of a central processing unit (CPU) of a corresponding streaming media server.

19. The system according to claim 15, wherein the load balancer is further configured to configure another server capable of providing a live broadcast service as the streaming media server according to a configuration request inputted by a user.

* * * * *